E. A. KELSEY.
WATER GAGE FOR STEAM BOILERS AND SIMILAR APPARATUS.
APPLICATION FILED APR. 14, 1916.

1,204,034.

Patented Nov. 7, 1916.
2 SHEETS—SHEET 1.

Witnesses:
Fred. Roegers.
Rachel Lieberman

Edgar A. Kelsey, Inventor

By Henry Schreiter his Attorney

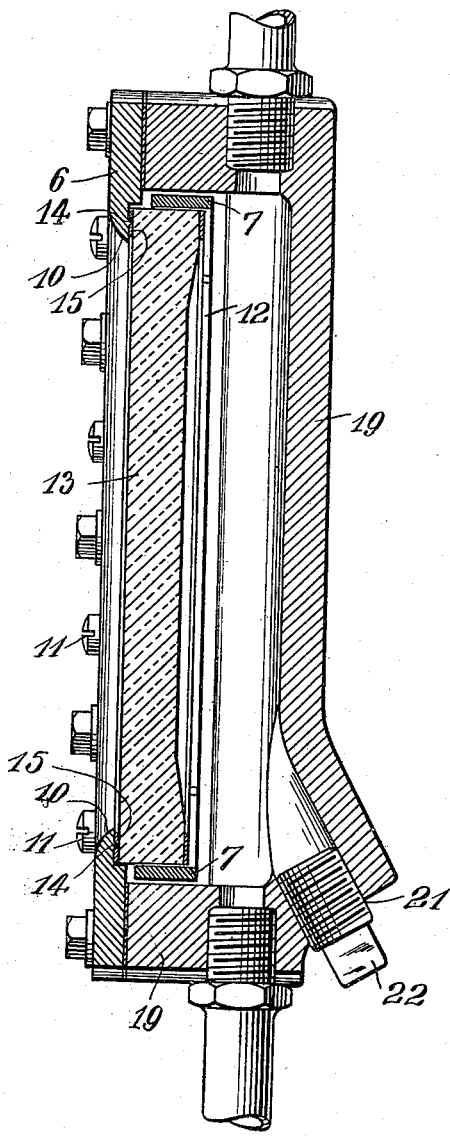
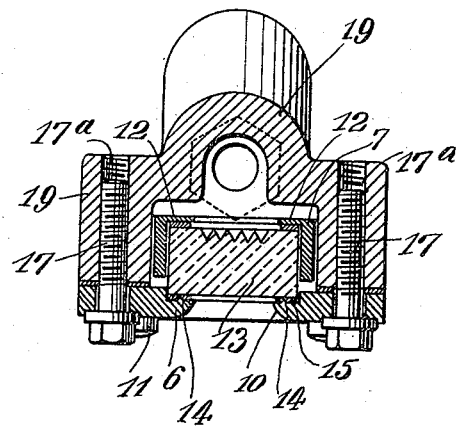
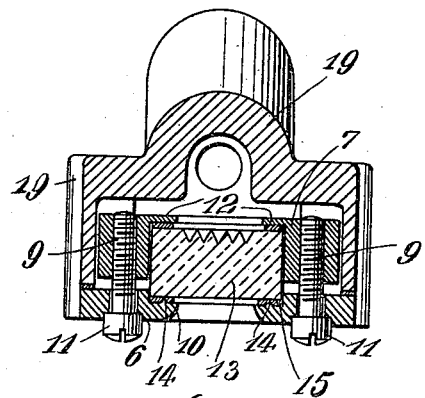

UNITED STATES PATENT OFFICE.

EDGAR A. KELSEY, OF MOUNT VERNON, NEW YORK.

WATER-GAGE FOR STEAM-BOILERS AND SIMILAR APPARATUS.

1,204,034.  Specification of Letters Patent.  Patented Nov. 7, 1916.

Application filed April 14, 1916. Serial No. 91,132.

*To all whom it may concern:*

Be it known that I, EDGAR A. KELSEY, a citizen of the United States, and resident of Mount Vernon, county of Westchester, State of New York, have invented a certain new and useful Improvement in Water-Gages for Steam-Boilers and Similar Apparatus, of which the following is a full, clear, and exact specification.

Figure 1:
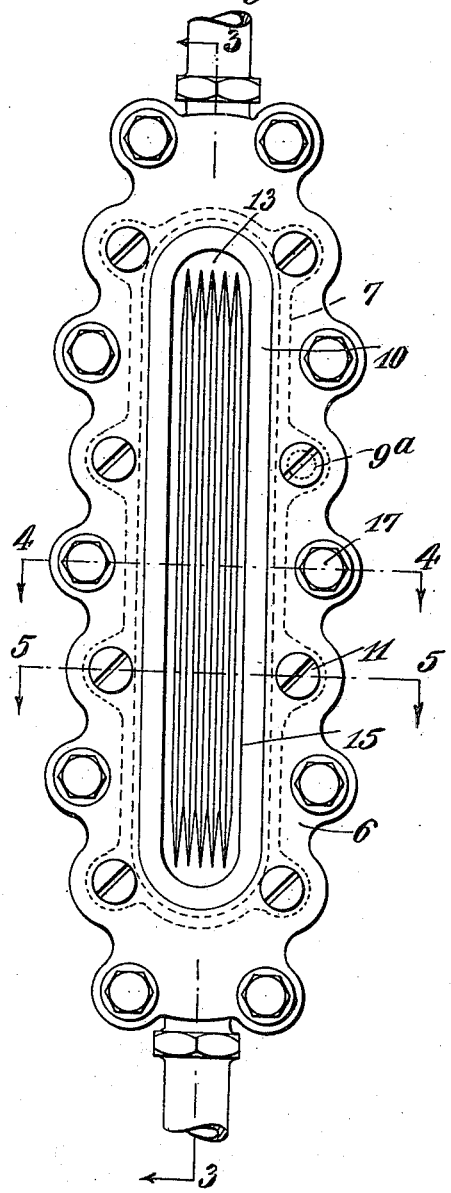
Figure 2:
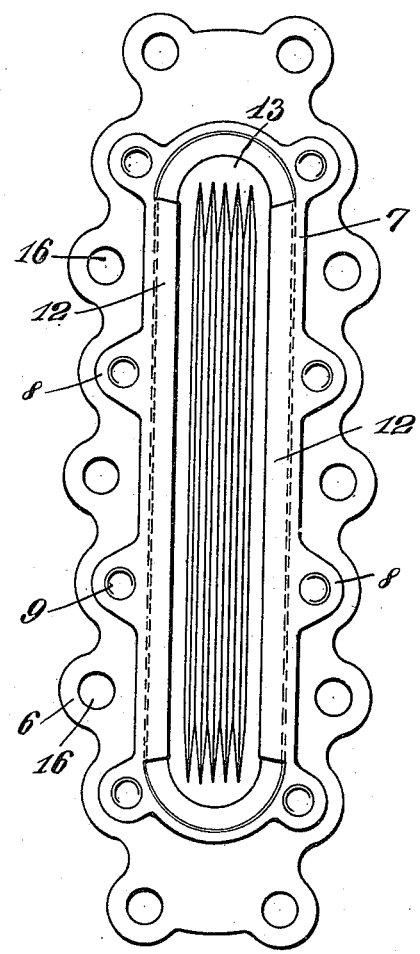

Water gages used on locomotive boilers and similar apparatus are subjected to great pressure and, on that account, the round, or so-called Scotch glasses have been replaced by a flat glass, of substantial thickness, set into a metallic casing. Also this glass is frequently fractured, and the efforts of the makers of gages to prevent it by increasing its thickness were not successful. This breaking of the glass is quite generally, though erroneously, ascribed to the steam pressure exerted thereon. Having been employed in this art for many years, and naturally interested in the subject, I have discovered, by close observation and experiments, that the frequent breaking of the glass in such water gages is not due to its inability to withstand the boiler pressure, but rather to the strains exerted thereon by the bolts, whereby the front plate, and the glass plate inclosed therein, are secured to the gage casing, in the effort to make a fluid-tight joint. This faulty construction, and the necessity to unscrew the front plate whenever the glass needs to be cleaned, and the disposition of engine drivers to still more tighten the screws whenever the gage is found leaking, are the sole cause of the so frequent fracturing of the glass. The glass is much less elastic than the metallic front plate of the gage, and must crack when subjected to such strains as are exerted thereon by the screws, unless utmost care is taken to prevent it when screwing on the front plate on the gage. The men, however, who tend the boilers, cannot be reasonably expected to know it, or to proceed so carefully and cautiously. This very detrimental defect in the construction of water gages is effectively prevented by the construction herein described, and shown in the accompanying drawings, wherein:

Figure 1 is a front view of my improved water gage; Fig. 2 a rear elevation of the front plate, showing also the frame, with the glass inserted therein affixed thereto; Fig. 3 is a longitudinal sectional view on line 3—3 of Fig. 1, and Figs. 4 and 5 are sectional views on lines 4—4, and 5—5 respectively, also indicated in Fig. 1.

In this improved construction, the glass is not subjected to the strains of the screws, whereby the front plate is secured to the gage casing, the glass is held thereto only to the extent to prevent its being forced in, when a vacuum is created in the gage by blowing off the boiler, and the pressure of the steam in the boiler is utilized to effect a fluid-tight joint between the glass and the front plate of the gage.

In the above enumerated figures of the drawings, 7 designates the frame, in which the glass 13 is set. This frame is made to fit the shape and dimensions of the standard shapes and sizes of gage glasses, though the glass 13 should not be too snugly incased therein. The depth of the frame is less than the thickness of the glass. On its rear, or inner, side the flanges 12 are provided, against which the glass 13 sets, when the frame 7 is screwed to the plate 6 of the gage. The enlargements 8 of the sides of the frame 7 are drilled correspondingly to the location of the holes 9ᵃ in the front plate 6, and the holes 9 screw-threaded for the screws 11, by which the frame 7 is secured thereto.

The front plate 6 is recessed around its opening on the side, to which the frame 7 is thus secured. The shape and dimensions of this recess correspond to the shape and dimensions of the glass 13, of which the part, protruding from the frame 7, enters into the recess and abuts against the flange 10 thus formed. A groove, or ridge, 14, or both, may be made in the flange 10, as shown in Figs. 4 and 5, and when assembling the parts a packing 15 is laid thereon. The ridge 15 is pressed into the packing, slightly by the drawing of the screws 11, and more so as the pressure in the boiler, acting upon the glass 13, increases. By this steam pressure, and not by the drawing of the screws 17, whereby the front plate 6 is secured to the gage casing, is a fluid-tight joint between the glass 13 and the plate 6 effected. Therefore the bolts 11, whereby the frame 7 is secured to the front plate 6 of the gage, need not be screwed in so tightly, or the glass subjected to any excessive pressure thereon by the screws.

To provide against breaking the glass 13 by a careless or excessive screwing in of the bolts 11, the flanges 12 in the frame 7 are made comparatively thin, so that they will bend out before the glass 13 can be fractured, if the screws 11 are so excessively screwed in. A gasket may be set on the flanges 12 as means of an additional safeguard, but this is not essential, and is not required to make the structure fluid-tight. The perforations 16 in the plate 6 serve for passing therethrough screws 17, entering correspondingly screw-threaded holes 17$^a$, whereby the plate 6 is affixed to the gage casing 19; a gasket or other suitable packing being interposed between it and the casing to make a fluid-tight joint. The plate 6 is thus affixed to the casing 19 after the glass frame 7, with the glass 13 set therein, is screwed thereto as explained. It will be noted, that by the screwing in of the screws 17, or by any other manner of securing the plate 6 to the gage casing 19, no strain can be exerted upon the glass 13, or upon the frame 7 wherein it is held.

To enable the glass 13 to be cleaned without requiring the plate 6 to be unscrewed, the opening, or outlet 21 is made, preferably at the lower end of the casing 19, through which a wiper, secured to a wire handle, may be inserted and the glass cleaned. The opening 21 when not so used is closed by plug 22 screwed therein.

By the herein shown and described improved construction of the water gage it is rendered unnecessary, and also quite impossible, to fracture the glass by an excessive or uneven pressure, exerted thereon by the screws, as it is done in the heretofore known constructions of water gages, because the glass is not exposed thereto, and the pressure within the boiler is utilized to effect a fluid-tight joint.

I claim as my invention:

1. A device for securing the glass in a water gage, comprising a frame plate provided with means for securing it to the gage casing, and having an opening corresponding in shape and size to the shape and size of the glass; a flange around, and partly reducing, the opening in the frame plate; a packing, conforming to the flange, and laid thereon; a frame adapted to partially inclose the glass, and means for securing the frame to the frame plate, to hold the glass inclosed thereby against the packing; substantially as herein shown and described.

2. A device for securing the glass in a water gage, comprising a frame plate provided with means for securing it to the gage casing and having an opening corresponding in shape and size to the shape and size of the glass; a flange around, and partly reducing, the opening in the frame plate; a ridge on the inner side of the flange, a packing, conforming to the flange, laid thereon; a frame adapted to partially inclose the glass, and means for securing the frame to the frame plate, to hold the glass against the packing; substantially as herein shown and described.

3. A water gage for steam boilers and for similar apparatus, comprising an open casing, provided with means for connecting it to the boiler; a plate fitted thereon, and having an opening therein, a flange surrounding the opening; an open frame, flanges on the sides in the rear of the frame; a glass fitted into the frame, and into the opening of the plate; a packing set in, between the glass and the flange surrounding the opening in the plate; means for securing the frame to the plate, and means for securing the plate upon the casing; substantially as herein shown and described.

4. A water gage for steam boilers and for similar apparatus, comprising an open casing, provided with means for connecting it to the boiler, a plate fitted thereon, and having an opening therein, a flange surrounding the opening; a ridge on the inner side of the flange; a packing laid on the flange; an open frame, flanges on the sides in the rear of the frame; a glass fitted into the frame, and into the opening of the plate; means for securing the frame to the plate, and means for securing the plate upon the casing; substantially as herein shown and described.

5. A water gage for steam boilers and for similar apparatus, comprising an open casing provided with means for connecting it to the boiler, an outlet at one end of the casing, a plug removably set therein, a plate fitted upon the casing and having an opening therein; a flange surrounding the opening; a ridge on the inner side of the flange, a packing laid on the flange; an open frame, flanges on the sides in the rear of the frame; a glass, fitted into the frame, and into the opening of the plate; means for securing the frame to the plate, and means for securing the plate upon the casing; substantially as herein shown and described.

EDGAR A. KELSEY.

Witnesses:
 JOHN A. ROBERTSON,
 CHARLES E. JOST.